(12) United States Patent
Miura et al.

(10) Patent No.: US 6,961,082 B2
(45) Date of Patent: Nov. 1, 2005

(54) IMAGE DISPLAY CONTROL SYSTEM REDUCING IMAGE TRANSMISSION DELAY

(75) Inventors: Masaki Miura, Kawasaki (JP); Kenzo Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 725 days.

(21) Appl. No.: 09/813,026

(22) Filed: Mar. 21, 2001

(65) Prior Publication Data

US 2002/0057348 A1 May 16, 2002

(30) Foreign Application Priority Data

Nov. 16, 2000 (JP) ....................................... 2000-350220

(51) Int. Cl.[7] ............................................. H04N 5/232
(52) U.S. Cl. .................. 348/211.9; 348/143; 348/211.3
(58) Field of Search ......................... 348/207.99, 207.1, 348/207.11, 211.99, 211.1, 211.2, 211.3, 211.4, 211.5, 211.7, 211.8, 211.13, 222.1, 333.01, 333.11, 333.12, 211.9, 143

(56) References Cited

U.S. PATENT DOCUMENTS

| 5,838,368 | A | * | 11/1998 | Masunaga et al. ........ 348/211.9 |
| 6,239,836 | B1 | * | 5/2001 | Suzuki et al. ............ 348/211.3 |
| 6,356,303 | B1 | * | 3/2002 | Shibata et al. ........... 348/211.1 |
| 6,452,628 | B2 | * | 9/2002 | Kato et al. ............. 348/333.12 |

FOREIGN PATENT DOCUMENTS

| JP | 10224772 A | 8/1998 | |
| JP | 10-224772 | * 8/1998 | .......... H04N/5/232 |
| JP | 2000101963 A | 4/2000 | |

* cited by examiner

Primary Examiner—Tuan Ho
(74) Attorney, Agent, or Firm—Staas & Halsey LLP

(57) ABSTRACT

A video display control method comprises generating camera operation information concerning an operation of a camera operated by remote control, transmitting data of video captured by the camera and the camera operation information to a control apparatus via a network; and processing the data of the video based on the camera operation information to display an image of the video at the control apparatus.

13 Claims, 12 Drawing Sheets

FIG. 5A PAN  FIG. 5B TILT  FIG. 5C ZOOM

FIG. 12A
FIG. 12B
FIG. 12C
FIG. 12D

IMAGE DISPLAY CONTROL SYSTEM REDUCING IMAGE TRANSMISSION DELAY

BACKGROUND OF THE INVENTION

1. Field of the Invention

The present invention generally relates to video display control methods, video display control systems, and apparatuses employed in such systems, and more particularly to a video display control method and a video display control system that control a camera from a remote location via a network and transmit video captured by the camera via the network to display the captured video, and an apparatus employed in such a system.

2. Description of the Related Art

Recently, the communication network environment has been shifting from circuit switching to an IP (internet protocol) network, which also requires video communication to be performed via the IP network. Video transmission as well as camera control is performed via a relatively low-speed IP network also in a video monitoring system that performs the camera control from a remote location. In this case, in order to perform the camera control accurately, it is necessary to quickly present a user with video obtained as a result of the camera control.

Compressed video still has a relatively large amount of data. Therefore, in the low-speed network, the amount of data to be transmitted becomes large for the network bandwidth, and a delay is prone to be caused in the data transmission. As a result, a response to the camera control is delayed, thus resulting in poor camera operability.

FIG. 1 shows an operation sequence of a conventional video display control method. In the drawing, when a control apparatus 1 performs operation control such as PAN, TILT, or ZOOM, the command signal is transmitted to a controlled apparatus 2 via a network. Propagation delay of a command (ex. 50 ms), a video encoding time (ex. 100 ms), and a delay in a transmission of compressed video data (ex. 50 ms) sums up to approximately 200 ms. Further, video transmission requires another 1,000 ms. Therefore, it takes approximately 1,200 ms before the control apparatus 1 obtains the video. This case is based on a transmission rate of, for instance, 100 Kbps, and if the transmission rate is 25 kbps, the delay is approximately 4 seconds.

Conventionally, response to a control command has been improved by reducing the amount of data to be transmitted by increasing a video compression rate or reducing a screen size. This, however, does not drastically improve the response, but has a disadvantage of causing deterioration in video quality.

SUMMARY OF THE INVENTION

It is a general object of the present invention to provide a video display control method, a video display control system, and apparatuses forming such a system in which the above-described disadvantage is eliminated.

A more specific object of the present invention is to provide a video display control method and a video display control system that allow a user to be quickly presented with video obtained as a result of camera control and that can perform camera control without stress on a low-speed line, and apparatuses forming such a system.

The above objects of the present invention are achieved by a video display control method including the steps of (a) generating camera operation information concerning an operation of a camera operated by remote control, (b) transmitting data of video captured by the camera and the camera operation information to a control apparatus via a network and (c) processing the data of the video based on the camera operation information so that an image of the video can be displayed at the control apparatus.

The above objects of the present invention are also achieved by a video display control system including: a first apparatus including a camera and generating camera operation information concerning an operation of the camera, the camera being operated by remote control; a second apparatus processing data of video captured by the camera based on the camera operation information so that an image of the video can be displayed; and a network connecting the first and second apparatuses, wherein the data of the video and the camera operation information is transmitted from the first apparatus to the second apparatus via the network.

According to the above-described method and system, the data of the video transmitted via the network is processed based on the camera operation information transmitted via the network. Therefore, the image of the video can be displayed to a user with a reduced transmission delay, and the camera can be controlled without stress with a low-speed line.

The above objects of the present invention are also achieved by an apparatus for a system where data of video and camera operation information is transmitted from the apparatus to a network so that an image of the video can be displayed, which apparatus includes a camera capturing the video, a camera control part controlling an operation of the camera operated by remote control, a camera operation determination part generating the camera operation information from the operation of the camera, and a camera operation information transmission part transmitting the camera operation information to the network.

According to the above-described apparatus, the camera operation information can be generated from any type of camera.

The above objects of the present invention are further achieved by an apparatus for a system in which data of video captured by a camera and camera operation information concerning an operation of the camera is transmitted via a network to the apparatus so that an image of the video is displayed at the apparatus, which apparatus includes a camera control part generating a control signal for controlling the camera from an operation of a user and transmitting the control signal to the network, a video processing part processing the data of the video based on the camera operation information, and a video display part displaying the image of the video generated in the video processing part.

According to the above-described apparatus, the image of the video can be displayed to the user with a reduced transmission delay.

BRIEF DESCRIPTION OF THE DRAWINGS

Other objects, features and advantages of the present invention will become more apparent from the following detailed description when read in conjunction with the accompanying drawings, in which:

FIGS. 12A through 12D are diagrams for illustrating the interpolation operation in a case of a low frame rate for transmission.

DETAILED DESCRIPTION OF THE PREFERRED EMBODIMENTS

A description will now be given, with reference to the accompanying drawings, of embodiments of the present invention.

Figure 1:
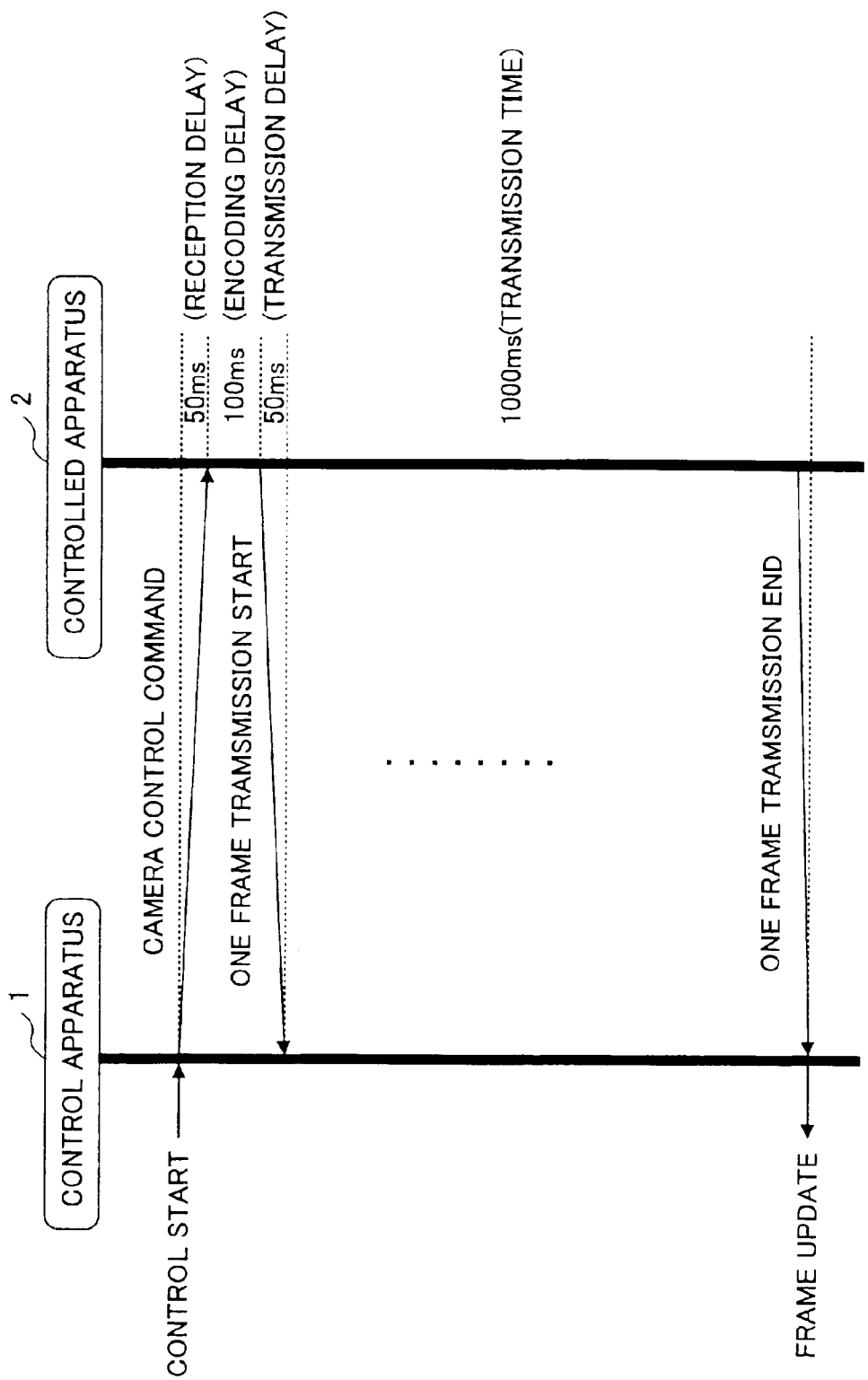
FIG. 1 is a diagram showing an operation sequence of a conventional video display control method.
Figure 2:
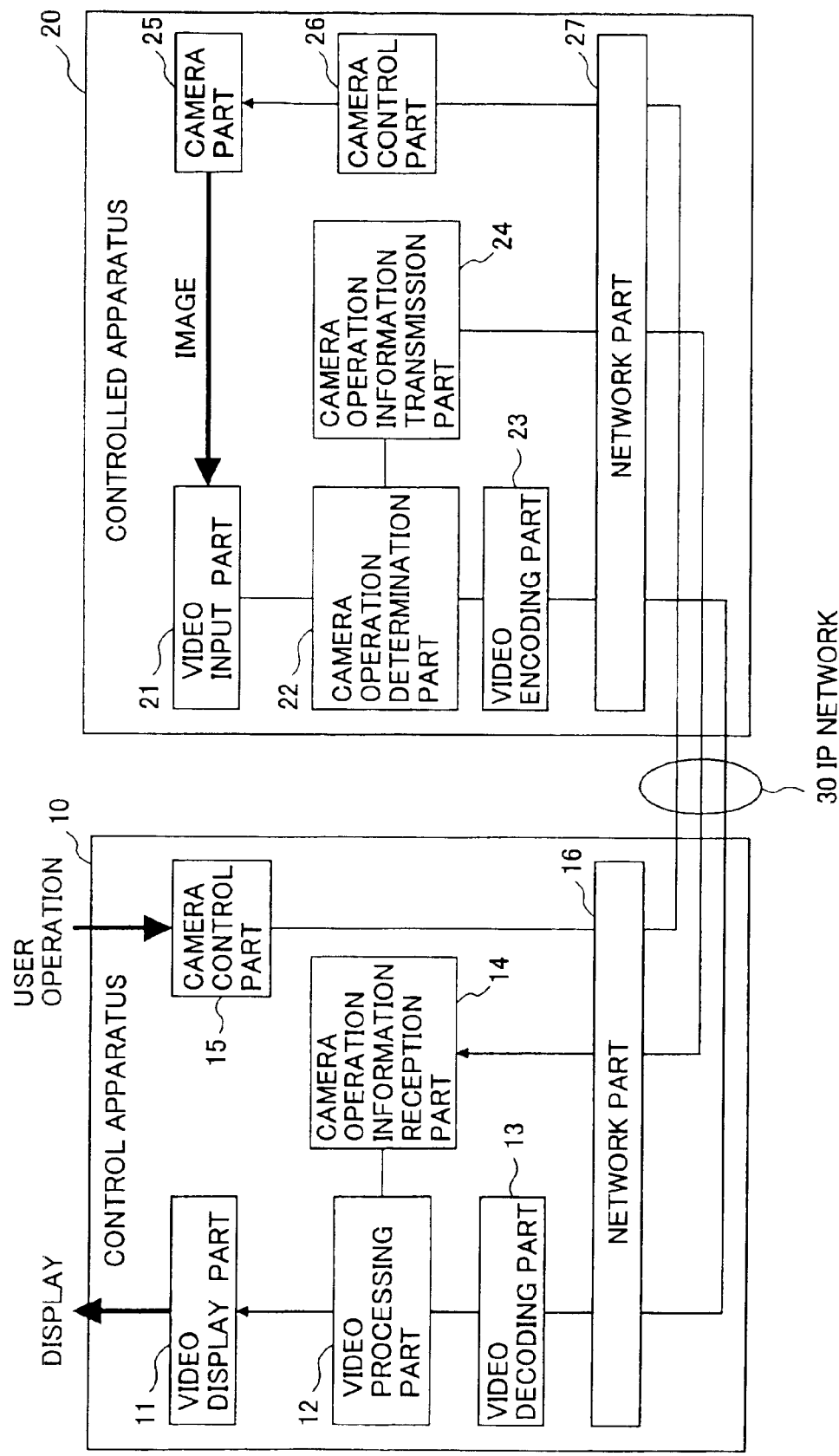
FIG. 2 is a diagram showing a structure of a first embodiment of a system to which a video display control method of the present invention is applied.

FIG. 2 shows a structure of a first embodiment of a system to which a video display control method of the present invention is applied. In the drawing, a control apparatus 10 by which a user controls a camera and a controlled apparatus 20 including the controlled camera are connected by an IP network 30 so as to form this system structure.

The control apparatus 10 includes a video display part 11, a video processing part 12, a video decoding part 13, a camera operation information reception part 14, a camera control part 15, and a network part 16. The controlled apparatus 20 includes a video input part 21, a camera operation determination part 22, a video encoding part 23, a camera operation information transmission part 24, a camera part 25, a camera control part 26, and a network part 27.

The user inputs control information such as PAN, TILT, or ZOOM of the camera part 25 to the camera control part 15 of the control apparatus 10. The network part 16 of the control apparatus 10 and the network part 27 of the controlled apparatus 20 are connected via the IP network 30 so that video information and the control information are transmitted. Thereby, the control information from the camera control part 15 is supplied via the IP network 30 to the camera control part 26 of the controlled apparatus 20 so that the camera control part 26 controls a PAN, TILT, or ZOOM operation of the camera part 25 based on the supplied control information. Video captured by the camera part 25 is taken into the video input part 21 as video data, and is supplied to the camera operation determination part 22. The camera operation determination part 22 determines an operation of the camera part 25 to be PAN, TILT, or ZOOM by processing the video data. The video encoding part 23 performs MPEG (Moving Picture Experts Group) encoding on the video data supplied from the video input part 21. Any algorithm may be employed for the above-described operation determination if appropriate for an apparatus in use. The operation determination may be performed based on a frame rate of the video input part 21, that is, for instance, every 1/30 second, or based on a frame rate of the video encoding part 23, that is, for instance, every few seconds. Minuter control is performable if the operation determination is performed on a higher frame rate.

The camera operation information transmission part 24 of the controlled apparatus 20 supplies camera operation information supplied from the camera operation determination part 22 to the network part 27 so as to transmit the camera operation information to the control apparatus 10. The video information output from the video encoding part 23 and the camera operation information output from the camera operation information transmission part 24 may be or may not be multiplexed before being transmitted from the network part 27. For instance, a system employing the ITU-T recommendation H.323 requires such information to be multiplexed, but a system employing the IP does not especially require such information to be multiplexed since the IP itself has a function of constructing a plurality of logical paths.

The camera operation information and the video information may be transmitted via separate networks. In this embodiment, the IP network 30 is employed as the network, but another network may be employed to transmit the above-described information. The video information output from the video encoding part 23 and the camera operation information output from the camera operation information transmission part 24 may be synchronized with or independent of each other in terms of time. A typical synchronization method transmits the camera operation information right before the video information.

The camera operation information reception part 14 of the control apparatus 10 outputs the camera operation information received by the network part 16 to the video processing part 12. The video decoding part 13 MPEG-decodes the video information received by the network part 16 and supplies the MPEG-decoded video information to the video processing part 12.

The video processing part 12, based on the camera operation information, processes the video data already output from the video decoding part 13 to perform operations corresponding to the PAN, TILT, ZOOM of the camera part 25, and displays the video on the video display part 11. The video processing in the video processing part 12 may be based on or independent of the reception timing of the camera operation information.

According to the above-described structure, even in a video monitoring by way of a low-speed network, the camera operation information explaining the motion of a whole screen is received before the entire video is received. Therefore, by the video processing, the video based on camera control can be generated and displayed with a reduced delay in responding to a camera control operation by the user. Further, since the camera operation information is generated by the video processing without any interface to the camera for obtaining the camera operation information, the camera operation information can be generated to any kind of camera.

Figure 3:
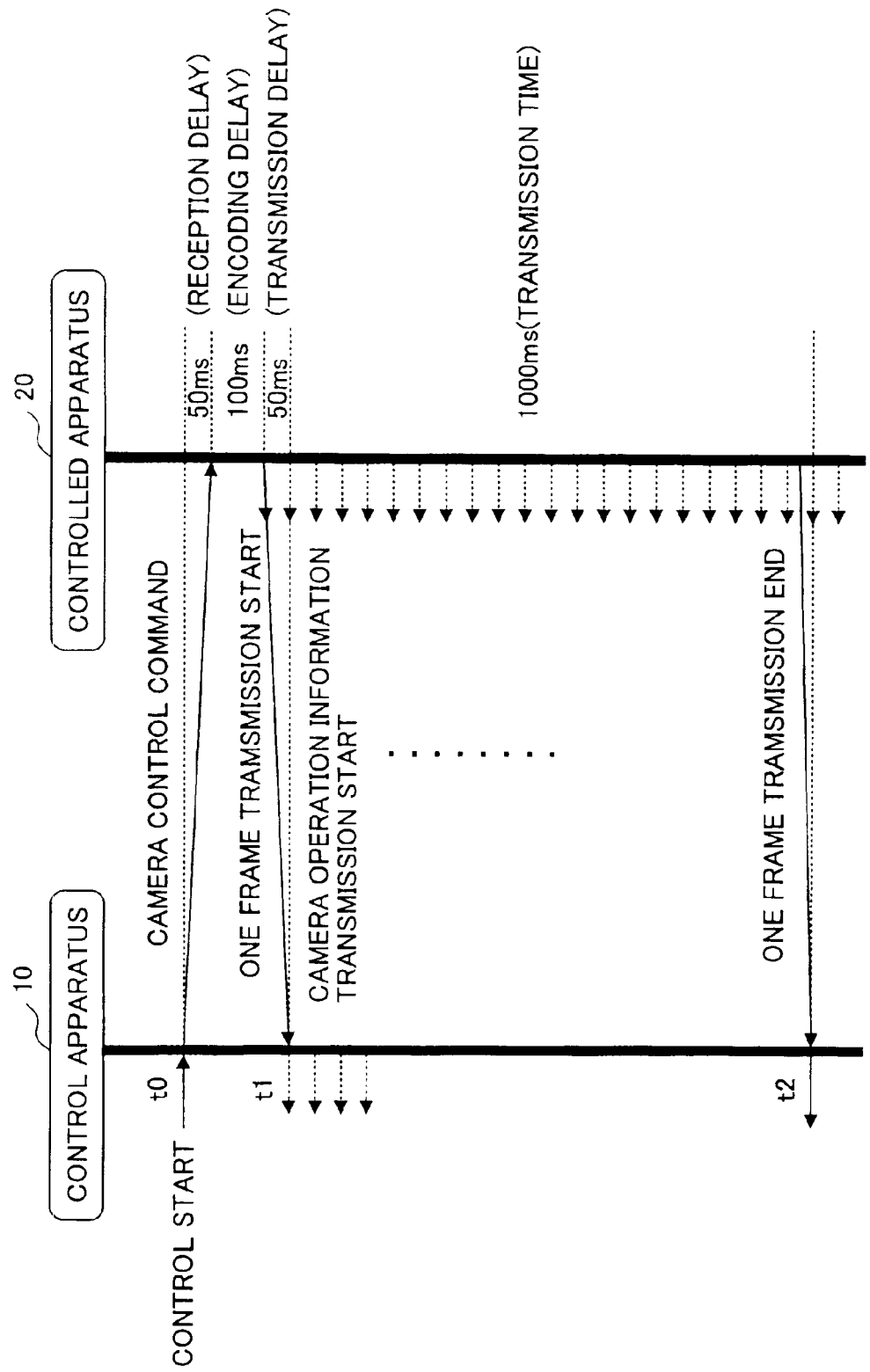
FIG. 3 is a diagram showing an operation sequence of an embodiment of the video display control method of the present invention.

FIG. 3 shows an operation sequence of an embodiment of the video display control method of the present invention. In the drawing, when the control apparatus 10 performs operation control such as PAN, TILT, or ZOOM, the control command is transmitted via the network 30 to the controlled device at a time t0. One video frame information and camera operation information is transmitted to the control apparatus 10 at a time t1 after the passage of approximately 200 ms that is the sum of the propagation delay of the command (ex. 50 ms), a video encoding time (ex. 100 ms), and a delay in transmitting compressed video data (ex. 50 ms).

Since, after the time t1, predicted video can be generated from preceding video frame data and the received camera operation information, video based on a pseudo camera operation can be displayed after the time t1. According to the conventional method, video cannot be displayed until the one video frame information is collected at a time t2. On the other hand, in this embodiment, a time from a camera control operation by the user until a screen update can be reduced by 85% compared with the conventional method.

Figure 4:
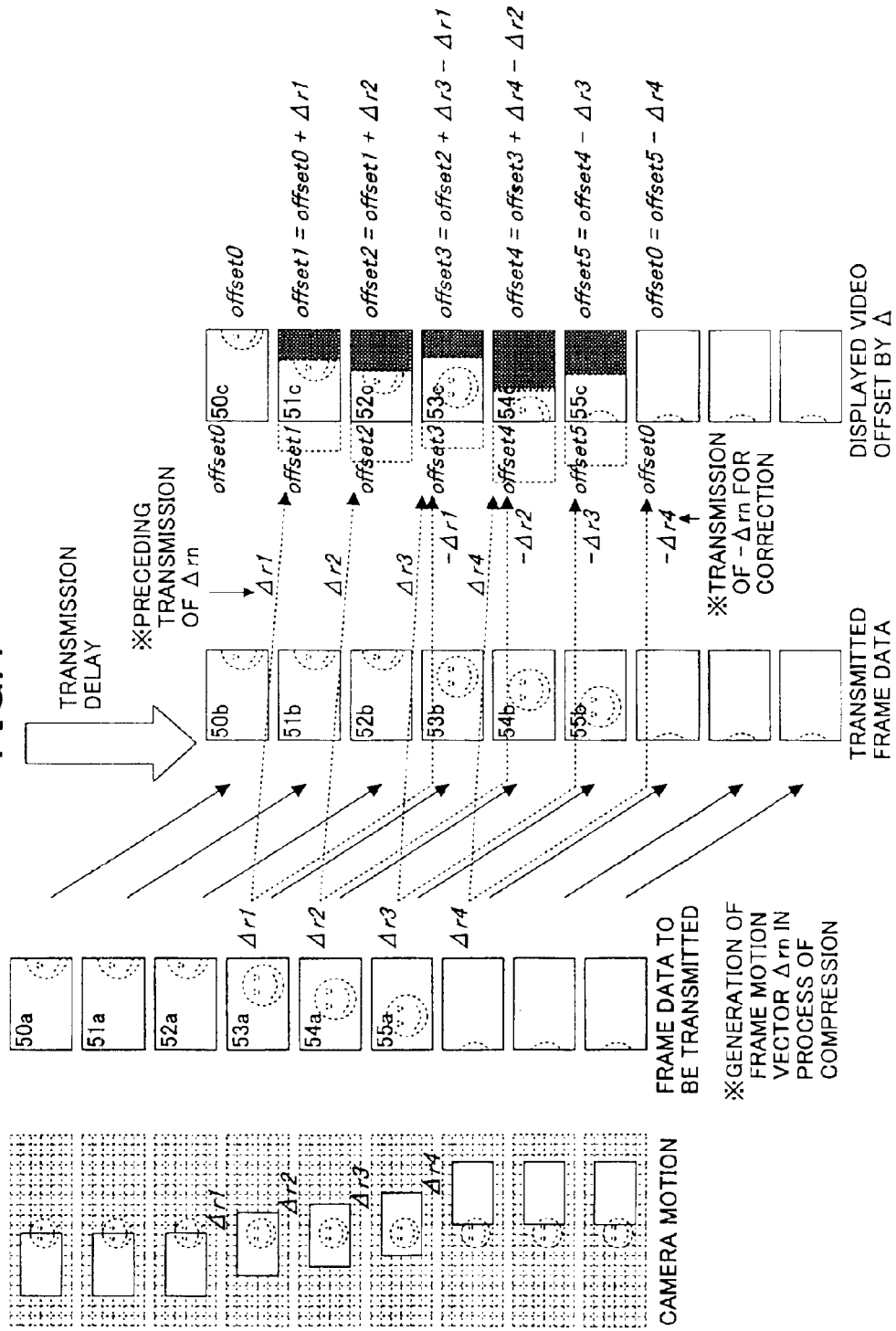
FIG. 4 is a diagram for illustrating an operation from a generation of camera operation information to a generation of predicted video by video processing according to the video display control method of the present invention.

Next, a description will be given of an operation from the generation of camera operation information to the generation of predicted video by the video processing according to the video display control method of the present invention. FIG. 4 shows frames to be transmitted 50a through 55a in the controlled apparatus 20, transmitted frames 50b through 55b in the control apparatus 10, and displayed video frames 50c through 55c subjected to the video processing in the control apparatus 10.

The transmitted frames 50b through 55b fall considerably behind the frames to be transmitted 50a through 55a due to transmission delay. If a PAN operation is started from a point of the frame 53a by the user's operation of the control apparatus 10, the number of pixels of a displacement of the camera part 25 by the PAN operation (a displacement pixel number $\Delta r1$) can be obtained by detecting the motion vectors of the frame 53a from the frame 52a. The displacement pixel number $\Delta r1$ is transmitted without waiting for the transmission of the video.

Due to the transmission delay, if a transmitted frame is merely displayed, the video of the frame 51b is displayed in the control apparatus 10 when the transmission of the frame 53a is started. However, by transmitting the displacement pixel number $\Delta r1$ to the control apparatus 10 independently or right before the transmission of the video so that the video processing can be performed based on the displacement pixel number $\Delta r1$ in the control apparatus 10, video corrected by the displacement pixel number $\Delta r1$ such as the frame 51c can be displayed. It can be seen that the frame 51c reflects the position information of the frame 53a from a comparison among the frames 53a, 51b, and 51c. However, the video information is not received, the video of the frame 51c lacks a part thereof as indicated by crosshatching in FIG. 4.

Thereafter, similarly by transmitting in advance the number of pixels of a displacement of the camera part 25 by a PAN operation (a displacement pixel number $\Delta rn$) so that the video processing can be performed based on the accumulation and correction of the displacement pixel number $\Delta rn$ in the control apparatus 10, a video display eliminating the effect of the transmission delay can be achieved. This allows the user to perform almost real-time camera control without the effect of the transmission delay.

Figure 5:
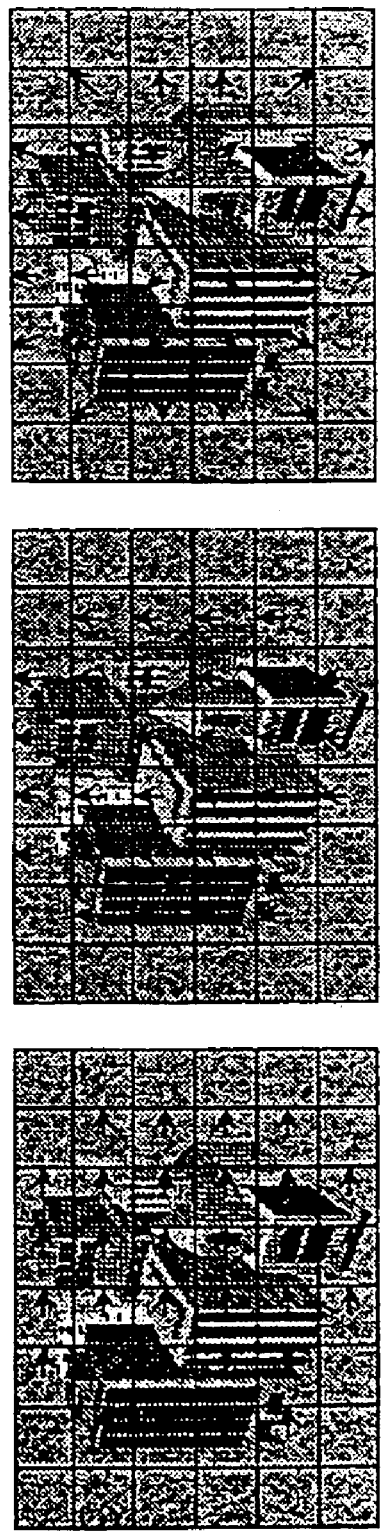
FIGS. 5A through 5C are diagrams for illustrating camera operation determination performed by a camera operation determination part shown in FIG. 2.

Next, a description will be given, with reference to FIGS. 5A through 5C, of a camera operation determination performed by the camera operation determination part 22. An embodiment shown herein focuses on motion vectors of video. Generally, when the camera part 25 performs a PAN, TILT, or ZOOM operation, a motion vector is generated in each of macro blocks forming a screen as indicated by each arrow in each of FIGS. 5A through 5C. By detecting and processing these motion vectors, the motion of the camera part 25 can be determined. FIGS. 5A through 5C show a PAN operation case, a TILT operation case, and a ZOOM operation case, respectively.

In the case of focusing on the motion vectors, a motion detection part employed in a commonly used DCT (discrete cosine transform) video encoder can be shared with the camera operation determination part 22.

Figure 6:
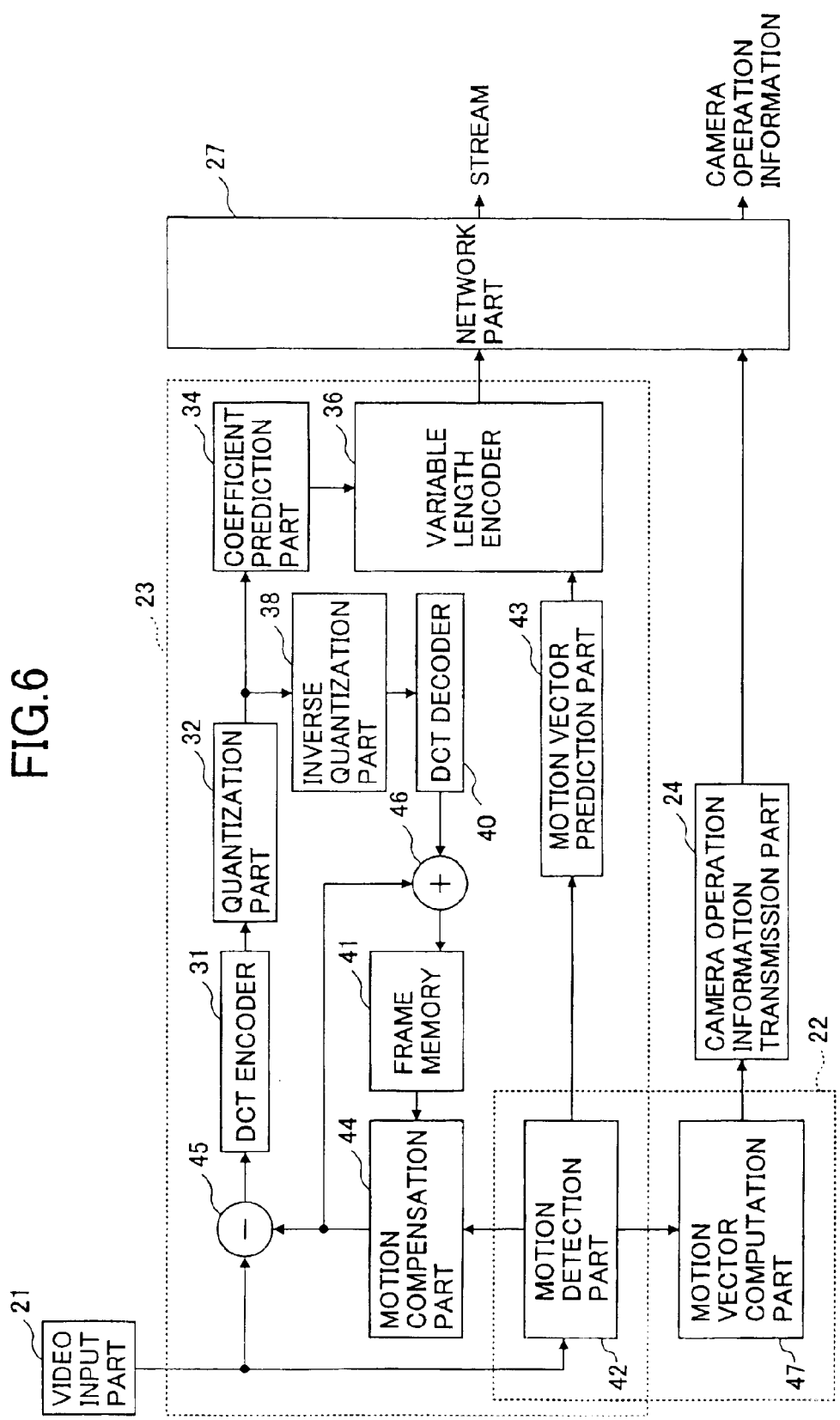
FIG. 6 is a block diagram of an embodiment of the camera operation determination part and a video encoding part shown in FIG. 2.

FIG. 6 is a block diagram of an embodiment of the camera operation determination part 22 and the video encoding part 23. In the drawing, video data supplied from the video input part 21 is DCT-encoded, for instance, by the block of 8 pixels×8 lines in a DCT encoder 31. Each obtained DCT coefficient is quantized based on its target bit and visual property in a quantization part 32 so that information compression is performed in terms of space. Then, each quantized DCT coefficient is supplied via a coefficient prediction part 34 to a variable length encoder 36. In the variable length encoder 36, macro block encoding information such as motion vectors and encoding modes, and the quantized DCT coefficients are subjected to variable length encoding that allocates a shorter code to data having a higher appearance frequency. Obtained variable length data is supplied to the network part 27.

Further, the quantized information is inversely quantized in an inverse quantization part 38 and is DCT-decoded in a DCT decoder 40 to be stored in a frame memory 41 as a reference screen. A motion detection part 42 supplies motion vectors obtained by detecting the motion of the screen to a motion vector prediction part 43, a motion compensation part 44, and a motion vector computation part 47. The reference screen read out from the frame memory 41 is supplied to the motion compensation part 44, which obtains macro block video data from the reference screen by motion prediction. The obtained macro block video data is supplied to a subtracter 45 and an adder 46. The subtracter 45 calculates a difference between the obtained macro block video data and the input macro block video data so as to obtain an prediction error signal. The prediction error signal is supplied via the DCT encoder 31 and the quantization part 32 to the variable length encoder 36.

The motion vector computation part 47 generates camera operation information by determining a camera operation based on the motion vectors detected in the motion detection part 42. This camera operation information is supplied to the camera operation information transmission part 24 and is output therefrom to the IP network 30 via the network part 27.

Figure 7:
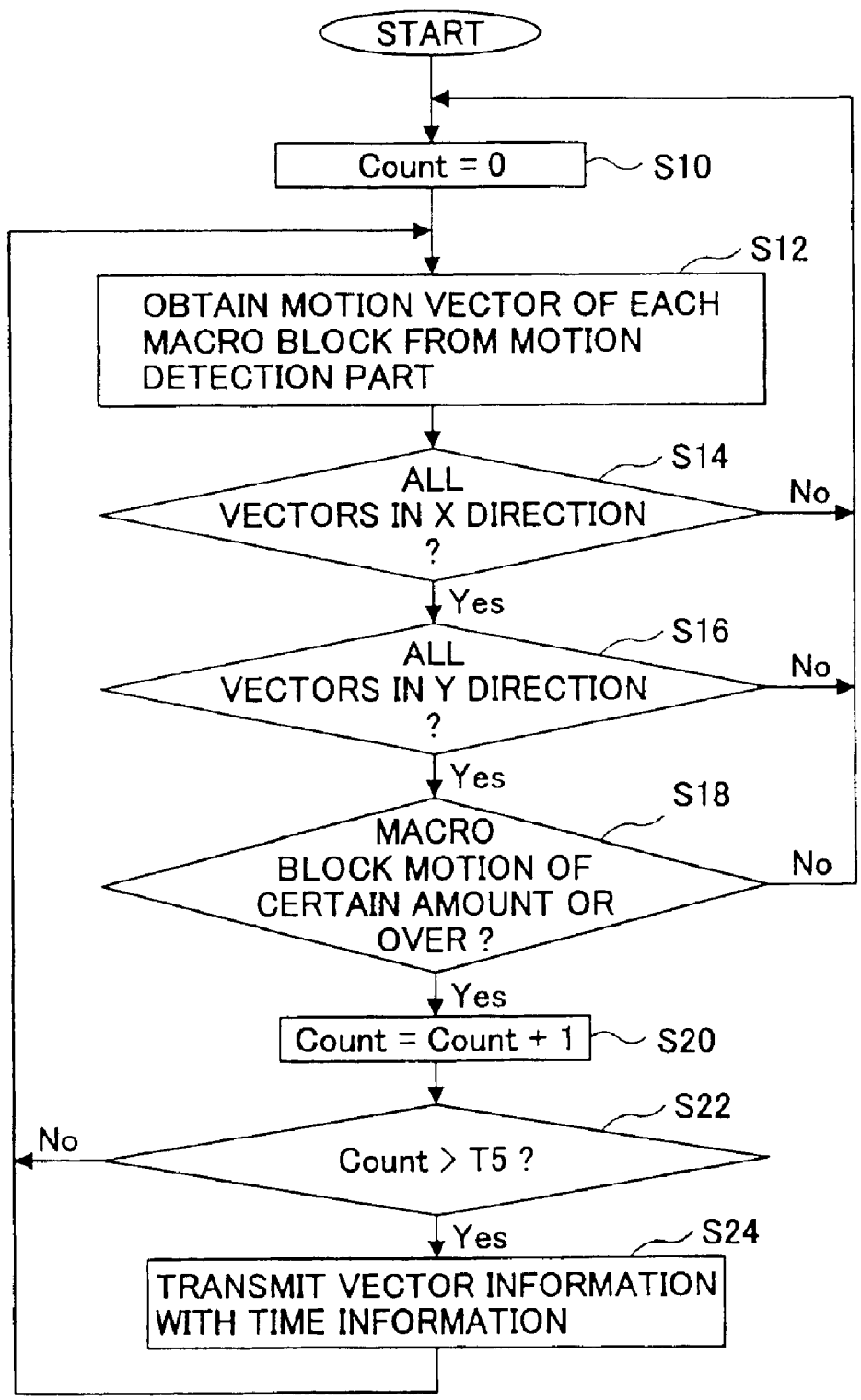
FIG. 7 is a flowchart of an embodiment of a PAN and TILT determination operation performed by a motion vector computation part shown in FIG. 6.

FIG. 7 is a flowchart of an embodiment of a PAN and TILT determination operation performed by the motion vector computation part 47. In the drawing, in step S10, a counter is reset to perform determination based on operation continuation. Next, in step S12, a motion vector of each macro block is obtained from the motion detection part 42, and in step S14, it is determined whether the motion vector of each macro block is generated in an x direction (in a lateral direction in the screen), that is, it is determined whether a camera operation is PAN.

If the above-described condition is satisfied, it is determined in step S16 whether the motion vector of each macro block is generated in a y direction (in a vertical direction in the screen), that is, it is determined whether the camera operation is TILT. If this condition is satisfied, in order to eliminate the effect of vibrations, it is determined in step S18 whether each macro block has a motion equal to or greater than a certain amount. If each macro block has a motion equal to or greater than the certain amount, the operation proceeds to step S20. If one of steps S14 through S16 is not satisfied, the operation returns to step S10 and repeats the above-described steps.

In step S20, the counter is advanced only by one, and in step S22, it is determined whether a counter value exceeds a given value T5. If the counter value exceeds the given value T5 and the motion lasts for a given period of time, in step S24, it is determined that the camera operation is PAN or TILT, and information collected into one motion vector is transmitted with time information employed in the control apparatus 10 being added to the collected information.

Figure 8:
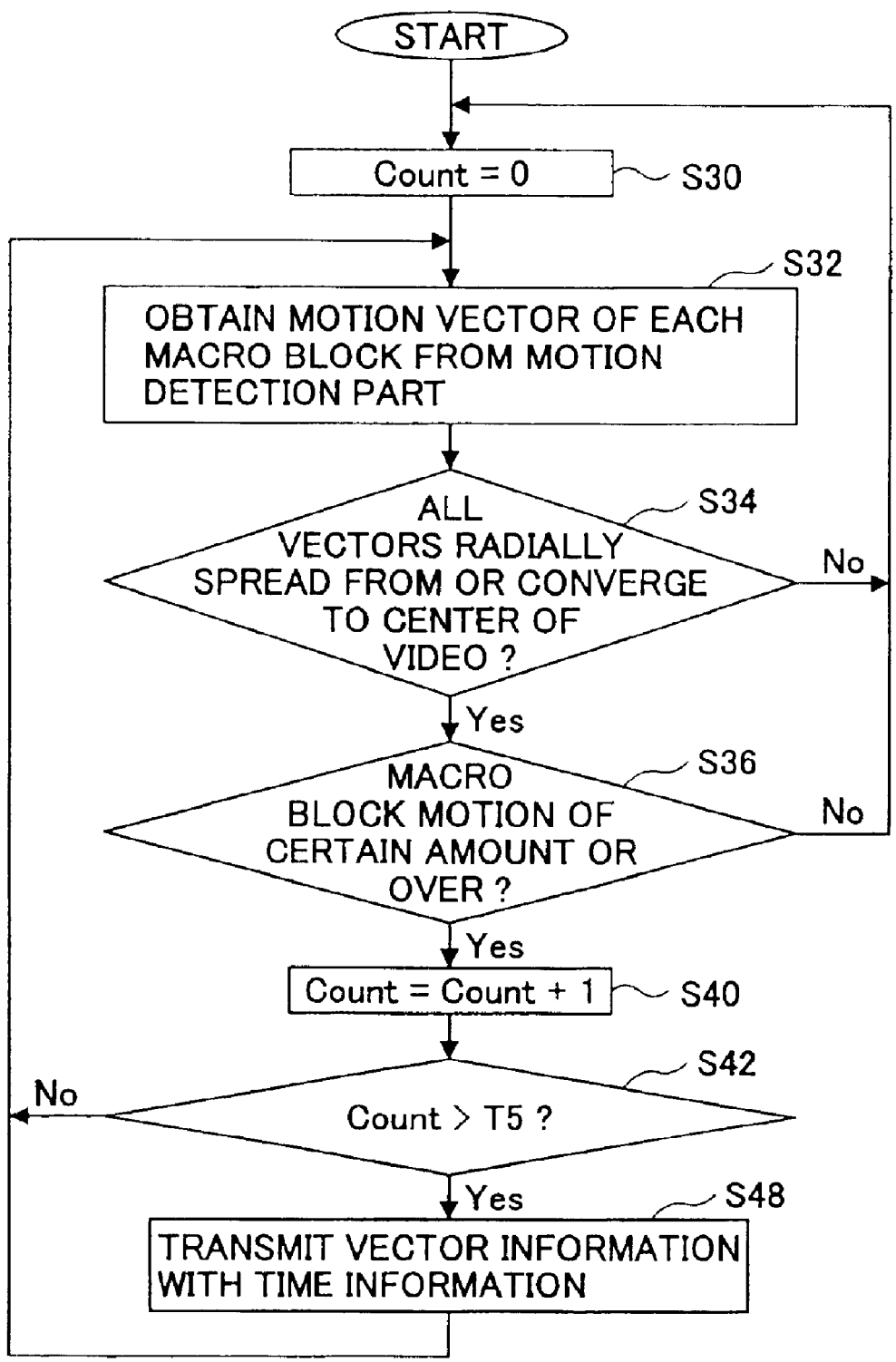
FIG. 8 is a flowchart of an embodiment of a ZOOM determination operation performed by the motion vector computation part.

FIG. 8 is a flowchart of an embodiment of a ZOOM determination operation performed by the motion vector computation part 47. In the drawing, in step S30, the counter is reset to perform detection based on operation continuation. Next, in step S32, a motion vector of each macro block is obtained from the motion detection part 42, and in step S34, it is determined whether or not the motion vectors radially spread from or converge to the center of the video by determining whether a direction of a radiation in each macro block and the motion vector of each macro block fall within a certain angle range.

If this condition is satisfied, in step S36, in order to eliminate the effect of vibrations, it is determined whether each macro block has a motion equal to or greater than a certain amount. If each macro block has a motion equal to or greater than the certain amount, the operation proceeds to step S40. If one of steps S34 and S36 is not satisfied, the operation returns to step S30 and repeats the above-described steps.

In step S40, the counter is advanced only by one, and in step s42, it is determined whether a counter value exceeds the given value T5. If the counter value exceeds the given value T5 and the motion lasts for a given period of time, in step S44, it is determined that a camera operation is ZOOM, and information collected into one zoom rate is transmitted with time information employed in the control apparatus 10 being added to the collected information.

Figure 9:
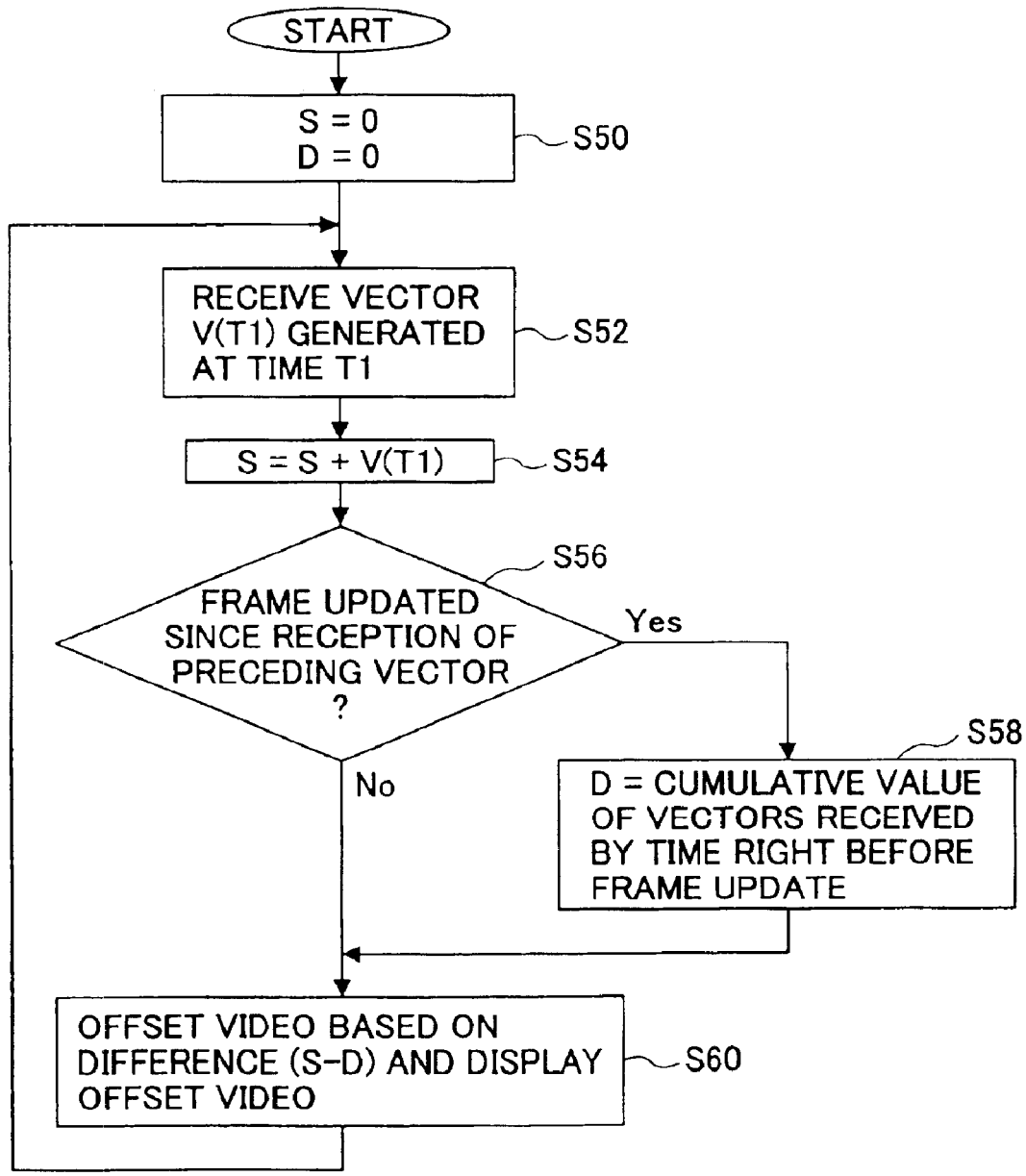
FIG. 9 is a flowchart of an embodiment of the video processing performed by a video processing part of a control apparatus shown in FIG. 2.

FIG. 9 is a flowchart of an embodiment of the video processing performed by the video processing part 12 of the control apparatus 10. In the drawing, in step S50, a cumulative value S that is an accumulation of every received motion vector, and a cumulative value D that is an accumulation of every motion vector received by the time right before a frame update to a presently displayed frame are cleared to be zero.

Next, in step S52, a motion vector of a vector generation time T1 (a motion vector V(T1)) is received, and in step S54, the motion vector V(T1) is accumulated on the cumulative value S. In step S56, it is determined whether a frame is updated since the reception of a preceding motion vector. If the frame is updated, the operation proceeds to step S58 to set a cumulative value of the motion vectors received by the time right before the frame update in the cumulative value D.

Then, the operation proceeds to step S60 to offset the video based on a difference (S-D) between the cumulative values S and D, and display the offset video. Thereafter, the operation returns to step S52 and repeats the above-described steps. Thereby, an appropriate amount of offset can be obtained constantly.

Figure 10:
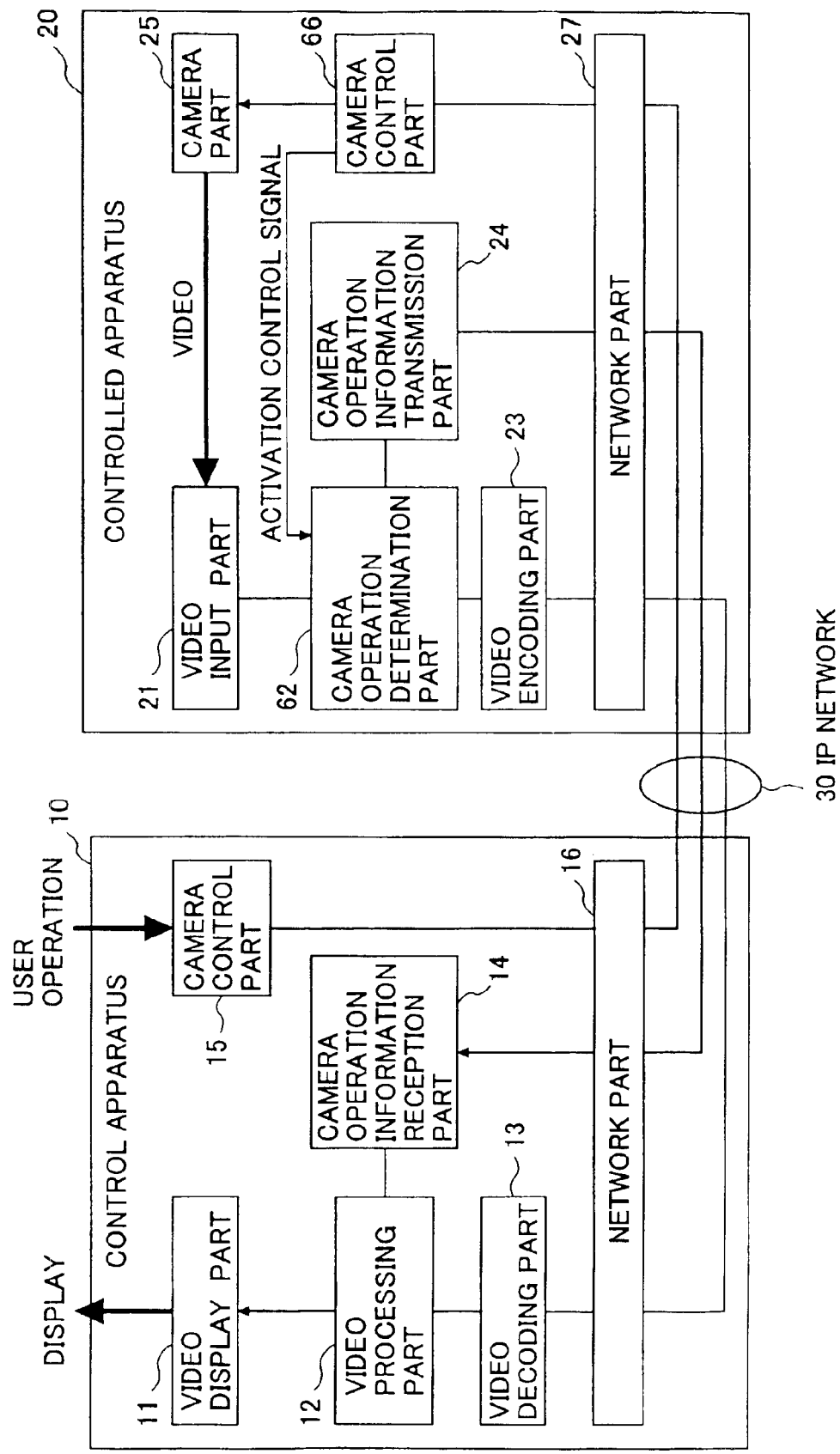
FIG. 10 is a diagram showing a structure of a second embodiment of the system to which the video display control method of the present invention is applied.

FIG. 10 shows a structure of a second embodiment of the system to which the video display control method of the present invention is applied. In the drawing, the same elements as those of FIG. 2 are referred to by the same numerals, and a description thereof will be omitted. In FIG. 10, a camera control part 66 of the controlled apparatus 20 recognizes control information (camera control command) supplied from the control apparatus 10 so as to control a PAN, TILT, or ZOOM operation of the camera part 25 based on the supplied control information and activate a camera operation determination part 62 only while the camera control is performed. Thereby, the camera operation determination part 62 processes video data to determine a camera operation to be PAN, TILT, or ZOOM. Since this determination operation is performed only while the camera operation determination part 62 is activated by the camera control part 66, a wrong recognition of the camera operation can be prevented, thus increasing accuracy in the camera control.

A variety of methods can be employed as the video processing method of the camera operation determination part 22 or 62. For instance, when the camera part 25 is not in motion, motion detection can be performed with higher accuracy by generating background subtraction video at the camera position, detecting a video region where no change occurs, and performing camera operation determination by employing data of the region.

Further, since a video motion in the control apparatus 10 precedes live video, the frames 51c through 55c each have a part lacking video data (a crosshatched part) as shown in FIG. 4. These parts can be interpolated.

Figures 11A, 11B, 11C:
FIGS. 11A through 11C are diagrams for illustrating an interpolation operation for a data-lacking part.

For instance, a storage part for a virtual large screen is provided in the control apparatus 10. In sequentially displaying on the video display part 11 a series of video frames shown in FIG. 11B of a scene shown in FIG. 11A, each video frame is compared with video already stored in the storage part, and a presently displayed video frame is written to the storage part in the best fitting position. At this time, an operation such as scaling or lens distortion correction is performed if necessary. The position where the presently displayed video frame is to be written can be roughly determined by employing motion vector information. By repeating this writing operation, a virtual large screen as shown in FIG. 11C can be generated to be stored in the storage part for a virtual large screen.

Further, in the case where the camera part 25 is not in motion, video from which a moving object is removed can be generated by performing the above-described writing to the storage part for a virtual large screen and adding a background subtraction operation. Brightness correction is performed on the presently displayed video based on surrounding video information so as to prevent variations in brightness.

Thereafter, in the case of the preceding video motion in the control apparatus 10, video data necessary for a part of the video lacking video data (a data-lacking part of the video) is extracted from the storage part for a virtual large screen to be employed for interpolation. Thereby, in the preceding video motion, the data-lacking part of the video can be naturally interpolated. The interpolation may be performed by filling the data-lacking part of the video with similar colors based on the analysis of a boundary between the data-lacking part and the remaining part of the video. The interpolation may also be performed by filling the data-lacking part with history video or boundary colors.

In the case of a low frame rate for transmission, according to the conventional method, the video of a scene shown in FIG. 12A captured by a PAN operation lacks its continuity as shown in FIG. 12B. On the other hand, according to the present invention in which the video motion in the control apparatus 10 precedes live video, frame interpolation is performed to display video frames at a rate higher than the frame rate as shown in FIG. 12C. Here, a time interval between successive frame transmissions (an interframe time interval) is divided into given time periods $\varDelta T$. A motion vector $\varDelta V$ per time period $\varDelta T$ is obtained from motion vectors V obtained by the time right before the last frame update. The video is displayed by being shifted by the number of pixels of the motion vector $\varDelta V$ at every time period $\varDelta T$. Thereby, the continuity of the video can be maintained.

Also, in this case, the interpolated frames have data-lacking parts as shown in FIG. 12C. However, by employing the above-described storage part for a virtual large screen, the data-lacking parts of the interpolated frames can be naturally interpolated as shown in FIG. 12D.

Thus, according to the present invention, even in the case of a video transmission via a relatively low-speed network, by processing video in the control apparatus 10 based on camera operation information of the controlled apparatus 20, video having a reduced transmission delay can be presented to the user on the side of the control apparatus 10, and a video monitoring system that can perform camera control without stress can be constructed even with a low transmission rate line.

The present invention is not limited to the specifically disclosed embodiments, but variations and modifications may be made without departing from the scope of the present invention.

The present application is based on Japanese priority application No. 2000-350220 filed on Nov. 16, 2000, the entire contents of which are hereby incorporated by reference.

What is claimed is:

1. A video display control method, comprising:

detecting motion of a video image captured by a camera by processing image data of the video image in a controlled apparatus, the camera being operated by remote control;

generating camera operation information concerning an operation of the camera from the detected motion of the video image;

transmitting the image data and the camera operation information from the controlled apparatus to a control apparatus via a network; and processing the image data based on the camera operation information so that the video image is displayed at the control apparatus.

2. The method as claimed in claim 1, wherein said generating generates the camera operation information by determining the operation of the camera based on the motion of the video image.

3. A video display control system, comprising:

a first apparatus including a camera operated by remote control, the first apparatus detecting motion of a video image captured by the camera by processing image data of the video image and generating camera operation information concerning an operation of the camera from the detected motion of the video image;

a second apparatus processing the image data based on the camera operation information so that the video image is displayed; and a network connecting said first and second apparatuses, wherein the image data and the camera operation information are transmitted from said first apparatus to said second apparatus via the network.

4. The system as claimed in claim 3, wherein the first apparatus generates the camera operation information by determining the operation of the camera based on the motion of the video image.

5. The system as claimed in claim 3, wherein the camera is operated from said second apparatus via the network.

6. A system in which image data of a video image is transmitted from a controlled apparatus to a control apparatus via a network so that the video image is displayed at the control apparatus, the system comprising:

a camera capturing the video image;

a camera control part controlling an operation of said camera operated by remote control from the control apparatus via the network;

a camera operation determination part detecting a motion of the video image by processing the image data and generating camera operation information concerning the operation of said camera from the detected motion of the video image; and a camera operation information transmission part transmitting the camera operation information to the network so that the image data is processed based on the camera operation information in the control apparatus.

7. The system as claimed in claim 6, wherein said camera operation determination part generates the camera operation information by determining the operation of said camera based on the motion of the video image.

8. The system as claimed in claim 7, wherein said camera operation determination part detects a motion vector of each of macro blocks forming the video image captured by said camera and determines the operation of said camera based on a direction and a magnitude of each of the motion vectors.

9. The system as claimed in claim 8, wherein said camera operation determination part shares a circuit for detecting the motion vectors with a video encoding part encoding the video image captured by said camera.

10. The system as claimed in claim 7, wherein said camera operation determination part determines the operation of the camera only while control of said camera is enabled.

11. A system in which image data of a video image captured by a camera of a controlled apparatus is transmitted via a network to a control apparatus so that the video image is displayed at the control apparatus, the camera being operated at the controlled apparatus by remote control from the control apparatus via the network, the system comprising:

a camera control part generating a control signal for controlling the camera from an operation of a user and transmitting the control signal over the network to a camera control part at the controlled apparatus;

a video processing part processing the image data based on camera operation information concerning the operation of the camera transmitted from the controlled apparatus, the camera operation information being generated from motion of the video image detected by processing image data of the video image; and a video display part displaying the video image based on the image data processed in said video processing part.

12. The system as claimed in claim 11, wherein said video processing part interpolates a lacked part of the video image.

13. The system as claimed in claim 11, wherein said video processing part interpolates interframe video so as to display frames of the video image at a rate higher than a frame rate of the image data.

* * * * *

UNITED STATES PATENT AND TRADEMARK OFFICE
CERTIFICATE OF CORRECTION

PATENT NO. : 6,961,082 B2
APPLICATION NO. : 09/813026
DATED : November 1, 2005
INVENTOR(S) : Masaki Miura et al.

It is certified that error appears in the above-identified patent and that said Letters Patent is hereby corrected as shown below:

Title Page, Column 2 (Foreign Patent Documents), Line 3, delete "2000101963" and insert - - 2000101983 - - therefor.

Signed and Sealed this

Eighth Day of August, 2006

JON W. DUDAS
*Director of the United States Patent and Trademark Office*